2,824,855

PREPARATION OF EPOXIDE RESINS

Stephen E. Freeman, Milwaukee, and Gordon W. Gottschalk, Port Washington, Wis., assignors to Freeman Chemical Corporation, a corporation of Wisconsin No Drawing. Application December 20, 1954
Serial No. 476,596

14 Claims. (Cl. 260—47)

This invention relates to improvements in the preparation of epoxide resins.

The term, "epoxide" is herein intended to refer to resins which contain an epoxy group, that is, a group comprising an oxygen radical linked to two carbon atoms which are, in turn, linked to each other in some other way, for example,

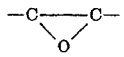

Generally, epoxide resins are made by the condensation of polyfunctional phenols such as dihydric phenols and either an epihalohydrin such as epichlorhydrin, or a dihalohydrin such as glycerol dichlorhydrin.

These resins are useful in the manufacture of varnishes, molding resins, adhesives, fibers, films, etc.

The following procedure is illustrative of a conventional method of preparing epoxide resins:

A caustic soda solution is made containing 1 mol caustic soda per mol of bisphenol (p,p'dihydroxy-diphenyldimethyl methane) dissolved in an amount of water, e. g., twice the weight of the bisphenol used. The bisphenol is then added to the caustic solution in a reaction kettle and with the aid of heat and agitation the bisphenol is dissolved. Epichlorhydrin is then added to the solution at a temperature of 35–45° C. with continuous agitation of the reaction mixture. The temperature rises to about 60–75° C. in 30 minutes, depending on the initial temperature, the batch size and the amount of water used. Larger amounts of water can be used to control the exothermic reaction. After this preliminary reaction, an additional amount of sodium hydroxide in water solution sufficient in amount together with that previously added to react completely with the chlorine of the epichlorhydrin, is added and heat applied if necessary to raise the temperature to around 80–85° C. over a period of 15–20 minutes. A further amount of sodium hydroxide is then added in water in excess of the theoretical amount required to react with all the chlorine present in the epichlorhydrin. This excess may be 15 to 20 percent more than theoretically required. The mixture is then heated to around 95–100° C. for a sufficient time to produce the desired products, e. g., from ½ hour to 3 hours.

The reactive mixture separates into an upper aqueous layer which is drawn off and a taffy-like resin which settles to the bottom. Practically, it is not conveniently possible to draw off more than about 90 percent of the aqueous layer containing dissolved sodium hydroxide and sodium chloride due to entrainment of the resin in the water. The resin products are then washed by stirring with hot water for 25–30 minutes and the wash water drained off. This washing procedure is repeated 4 to 6 times or more to remove all the unreacted sodium hydroxide and the sodium chloride. It is also possible to incorporate the use of acid such as acetic or hydrochloric in the wash water to neutralize the excess caustic.

The last traces of caustic and of basic salts such as sodium acetate must be removed before the drying step to follow, since their presence may catalyze further polymerization of the resin to a gel at the temperatures used to dehydrate the resins. After thorough washing, the resin is heated with agitation to drive off the residual water. This requires temperatures substantially above the boiling point of water to effect dehydration, e. g., up to 150° C.

Many resins, especially those useful in coating, have softening points of 95° C. and higher. Without the use of pressure to obtain higher temperatures with the water system, resins with softening points higher than 95° C. cannot be produced by the method described above since it is impossible mechanically to agitate the mass.

In preparing these resins, it is essential to remove the alkali entirely in order to avoid undesirable polymerization either during the dehydration step or upon standing or aging. The neutralization of the alkali, of course, produces salts and the removal of these salts has presented an impracticable burden because of the vast quantities of washing required. It has been suggested to dissolve the resin in acetone and after filtering to free it from water and solvent, but this requires a great deal of solvent and has proved very costly.

Mere washing of the resin with water to remove alkali and salts is difficult because of the high viscosity and taffy-like character of the resin. If suitable contact is obtained by agitation, there is a tendency to lose resin by mechanical dispersion of the resin in the wash water. Furthermore, an agitator of considerable power is required because of the high viscosity of the resin.

In spite of the difficulties, standard procedure, up to the time of the present invention, has been to wash the resin repeatedly with hot water until all traces of residual alkali are removed, after which the water is removed by evaporation with heat.

These difficulties are avoided in the present invention in which the condensation reaction is carried through in the normal fashion up to and including the point where the aqueous solution is decanted from the resin so far as possible. At this point in the operation, a stripping liquid is added to the system, preferably in an amount sufficient to give about 20–50% of this volatile liquid in the reaction vessel.

The stripping liquid(s) should possess the following characteristics:

The stripping liquid should be capable of boiling in the presence of water thereby assisting in the removal of the water from the resin; the fluid should be substantially immiscible with the water at the temperature of the condensed liquids in the separator; the fluid should be capable of boiling either at atmospheric pressure or non-atmospheric pressure within the range of about 71–99° C., preferably about 82–93.3° C.; and the fluid should not be capable of appreciable reaction with the resin or residual material, as exemplified by alkali(s) and/or salts. It has been found that if the stripping liquid is also a solvent for the resin, there is a reduction in the viscosity of the resin and the resulting intimacy of the contact of the liquid with the entrapped water in the resin is advantageous in conducting effective and economical water removal.

If desired, the stripping liquid may contain a modifier which is a relatively less active stripping liquid. This modifier reduces the amount of relatively active stripping liquid required and may serve to adjust the evaporation rate of the resin system after the alkali(s), water and salts have been substantially removed. For example, the combination of a stripping liquid such as methyl ethyl ketone with a modifier or less active stripping liquid such as xylol would reduce the water-solubility of the system quite satisfactorily.

Suitable stripping liquids are exemplified by the following:

Diethyl ketone
Methyl ethyl ketone
Methyl isobutyl ketone
Ethyl butyl ketone
Diisobutyl ketone
Ethyl n-butyl ether
n-Butyl ether
Butyl ethyl ether of ethylene glycol Combinations of these stripping liquids may be used either with or without less active stripping liquids or modifiers such as toluene, benzene and xylene or similar hydrocarbon type liquids; or a less active stripping liquid or modifier such as toluene may be employed by itself. The stripping liquids and modifiers should not be reactive to the resin nor be unstable to heating in the presence of alkaline water-solutions. These requirements eliminate the use of esters, unless the system is neutralized before adding a stripping liquid. Examples of suitable esters are as follows:

Ethyl acetate
Isopropyl acetate
Secondary butyl acetate
n-Butyl acetate
Ethyl propionate A practical consideration in selecting the stripping liquid is that the distillate should form (at least) a two layer condensate with water, one of which is high in water content and the other of which is high in stripping liquid content.

In carrying out the invention a stripping liquid such as methyl isobutyl ketone is added to the resin which contains mechanically held water plus salts and a slight excess of alkali which has not been neutralized. It is preferred to neutralize the excess alkali with an acid such as diluted hydrochloric acid or any other acid which does not affect the resin. Neutralization of this excess alkali tends to obviate saponification of the stripping liquid and facilitates filtration of the precipitated salts from the solution at a later stage, as will be discussed hereinafter.

The neutralized system is heated in a closed vessel and a mixture of water and a stripping liquid such as methyl isobutyl ketone distills into a condenser fitted with a separating system which allows the water to separate and the stripping liquid to return to the kettle. During the removal of the water, the boiling point is about 82° C. When most of the water has been distilled off, the boiling point of the system slowly rises. The boiling point of pure methyl isobutyl ketone is about 115.5° C.; the system ultimately reaches this temperature unless reduced pressure is applied to the system.

It has been found that any temperature above about 99° C. is undesirable since it tends to accelerate the formation of polymer. Although satisfactory results are obtained when the system is operated at about 71–99° C., the preferred range is about 82–93.3° C.

As the boiling point begins to rise, the salts in the system begin to precipitate. By retaining the stripping liquid during the entire operation, the viscosity of the resin is reduced which facilitates removal of the salts. During the later stages of the distillation, we have found it advantageous to impose a partial vacuum to prevent the temperature from going above about 99° C. Preferably, the temperature is held within the range of about 82–93.3° C. until all the water has been removed, although as stated above, a temperature range of about 71–99° C. is satisfactory.

In order to maintain the distillation system at a generally constant temperature level it may be desirable to reduce the pressure within the system. For example, when the system is initially started and thereafter maintained at atmospheric pressure, it may be necessary or desirable to apply a reduced pressure (i. e.—vacuum), thus enabling the system to maintain its initial operating temperature range.

Reduction of the temperature to below about 71° C. will produce a higher viscosity. For that reason, it is preferred not to go to too low a temperature. A lower viscosity can be reached at a lower temperature provided the solids content is maintained low, but it is preferred to maintain a high solids content which is more adaptable to later procedures and is more economical.

Once the water has been removed, the salts and any caustic soda present become insoluble and precipitate in finely divided form. By filtration through paper or other filtering media, preferably with the use of common filter aids, the salts and alkali may be removed so completely as to be undetectable by the use of normal indicators.

A test for determining their absence is to shake the resin solution violently with pure water, after which the water is tested with phenolphthalein for alkali and silver nitrate for chloride. When properly filtered, negative results should be obtained with both tests.

Resins may be prepared by this method ranging from those containing 1 mol of bisphenol to 2 mols of epichlorhydrin to those containing 1 mol of bisphenol to 1.22 mols of epichlorhydrin. The reduction of viscosity by the solvent permits the use of ordinary agitators.

Resins with a ratio of 1 mol of bisphenol to less than 1.22 mols of epichlorhydrin produce a greater viscosity which is too high for normal type agitators. However, if at that stage of the condensation and water evaporation additional methyl isobutyl ketone or similar solvent is added, the viscosity may be reduced to permit resins of the lower epichlorhydrin content to be prepared.

It has been found that occasionally filtration is rather difficult due, apparently, to some unneutralized finely divided alkali. If the material is thoroughly neutralized, this difficulty is normally avoided. Furthermore, complete neutralization results in a resin solution which is stable on long storage whereas even a trace of alkali tends to cause polymerization on storage. Similarly, if the temperature is permitted to go substantially above about 99° C. during dehydration, the stability is lowered.

If desired, our improved method may be employed in preparing epoxide resins resulting from the reaction of (a) a polyfunctional phenol, such as a dihydric phenol, free from reactive groups other than phenolic hydroxyl groups, as exemplified by bisphenol, resorcinol or 1,5 dihydroxynaphthalene with (b) either an epihalohydrin such as epichlorhydrin or a dihalohydrin such as glycerol dichlorhydrin.

The following examples serve to illustrate the present invention, but are not to be regarded as limiting the invention in any way:

*Example I*

A caustic soda solution was prepared by dissolving 13.15 pounds of sodium hydroxide in 133 pounds of water in a reaction vessel equipped with a mechanical stirrer. The solution was then heated to about 51.6° C. and 53.60 pounds of Bisphenol A were added; upon agitation, the Bisphenol A dissolved. 26.60 pounds of epichlorhydrin were then rapidly added in about a one minute period. The reaction mixture was agitated and, within about 20 minutes, the temperature of the reaction mixture rose to about 93.3–96° C. This temperature range was maintained for about 40 minutes (about 1 hour after the addition of epichlorhydrin). The reaction mixture separated into an upper aqueous layer which was drawn off; a taffy-like resin settled to the bottom of the reaction vessel. The resinous material was washed once with near-boiling water and the washed mother liquor was again decanted. The washed resin was neutralized by slowly adding 0.55 pound of concentrated hydrochloric acid (1:2H$_2$O) in increments while agitating the resinous product. While agitation was continued, 30.10 pounds of methyl isobutyl ketone were added to the resin. The neutralized system was heated in a closed vessel and a mixture of water and methyl isobutyl ketone distilled into a condenser fitted with a separating system which allowed the water to separate and the solvent to return to the kettle. During the removal of the water, the boiling point was around 82° C. When most of the water was distilled off, the boiling point of the system slowly rose and a partial vacuum was applied to the system in order to maintain the system at a temperature below about 99° C.; however, the system was kept at a temperature high enough (about 71–73.8° C.) to keep the resin in a fluid state. After all of the water had been removed, a filter aid was added to the resin (Dicalite 4200, diatomaceous earth). The resin (with the filter aid) was filtered in order to remove the solids and alkali. The filtered resin was adjusted to 70% total solids with methyl isobutyl ketone.

*Example II*

In Example 1, supra, the upper aqueous layer was decanted from the reaction mixture and a taffy-like resin settled to the bottom of the reaction vessel. The resinous material was then washed once with near-boiling water. The washed mother liquor was decanted and the washed resin was neutralized with concentrated hydrochloric acid. In the instant example, the same general procedure was followed. However, the resinous material was not washed with near-boiling water, but, instead, was treated directly with 2.45 pounds of concentrated hydrochloric acid. The omission of the hot water wash thus necessitated the use of a greater quantity of hydrochloric acid. The following weight materials were employed.

150.50 pounds of water
17.3 pounds of sodium hydroxide
51.60 pounds of Bisphenol A
31.30 pounds of epichlorhydrin
30 pounds of methyl isobutyl ketone
2.45 pounds of concentrated HCl

*Example III*

The same procedure was followed as set forth in Example I, however, the following weight materials were employed:

167.00 pounds of water
18.55 pounds of sodium hydroxide
47.10 pounds of Bisphenol A
38.3 pounds of epichlorhydrin
17.50 pounds of methyl isobutyl ketone
0.750 pounds of concentrated HCl An additional quantity of methyl isobutyl ketone (12.50 pounds) was added to the reaction mixture after the reaction mixture was neutralized with HCl.

*Example IV*

The same procedure was followed as set forth in Example I, however, the following weight materials were employed:

88.90 pounds of water
10.22 pounds of sodium hydroxide
30.42 pounds of Bisphenol A
18.47 pounds of epichlorhydrin
Stripping liquid:
  8.83 pounds of xylol (less active stripping liquid or stripping liquid modifier)
  8.83 pounds of methyl isobutyl ketone (stripping liquid)

The final resinous product had a 70% total solids content. 8.22 pounds of Bisphenol A were added to this resinous reaction product. 0.94 pound of ethylene diamine (catalyst) in methyl isobutyl carbinol were added to the reaction mixture of the Bisphenol A and 70% solution of resin in methyl isobutyl ketone. The reaction mixture was then heated to about 110–121° C. under reflux conditions until the resin became too heavy to agitate effectively. 4.53 pounds of xylol plus 4.53 pounds of methyl isobutyl ketone were added to dilute the mass in the kettle to about 60% total solids; heating was continued. The temperature was held at about 110–121° C. until the viscosity of W–Y (Gardner-Holdt scale) at 50% in 50:50 methyl isobutyl ketone-xylol solution was reached. The reaction mixture is then neutralized with a small amount of hypophosphorous acid. The neutralized reaction mixture was then refluxed to remove a trace of water (a portion of which may have been formed by the addition of hypophosphorous acid). The resinous product was then adjusted to 50% total solids with 11.39 pounds of Cellosolve acetate and 11.39 pounds of diacetone alcohol (thinners).

*Example V*

The same procedure was followed as set forth in Example I, however, the following weight materials were employed:

188.00 pounds of water
21.10 pounds of sodium hydroxide
53.60 pounds of Bisphenol A
43.60 pounds of epichlorhydrin
0.50 pounds of concentrated HCl
20.00 pounds of secondary butyl acetate (stripping medium)

The secondary butyl acetate was added after neutralization with the HCl. The resinous product was adjusted to 75% total solids by the addition of a thinner.

*Example VI*

The same procedure was followed as set forth in Example I, however, the following weight materials were employed:

139.90 pounds of water
16.10 pounds of sodium hydroxide
47.90 pounds of Bisphenol A
29.02 pounds of epichlorhydrin
0.5 pounds of concentrated HCl
16.20 pounds of toluol The resinous product was adjusted to about 65% total solids content by the addition of 17.50 pounds of Cellosolve acetate and 1.30 pounds of toluol.

The present method which may leave the resin dissolved in the stripping liquid, if desired, is readily adaptable to the preparation of higher molecular weight epoxide resins from lower molecular weight types, as illustrated in Example IV, supra. Heretofore, it has been essential to fuse the resin with a phenolic compound in order to accomplish this result, but by the present method, the operation may be carried out at the refluxing temperature of a stripping liquid such as methyl isobutyl ketone, particularly if a catalyst such as an amine is added. Ethylene diamine has been found to be particularly suitable for this purpose. Normally, less than 0.5% based on the whole solution is required for this purpose. It is possible by the use of such a catalyst to prepare a whole series of resins of increasing molecular weight and the process may even be carried considerably farther than with the fusion process because the molecular size is limited only by the solubility of the resin and the available solvents at the temperatures employed.

Stability of the ultimate product is obtained by neutralization with an acid. Hypophosphorous acid has been found to be particularly advantageous since it also contributes a bleaching action.

Amines have a tendency in some cases to cause an after-yellowing on baking of the resin film. Amines of the type shown in United States Patent No. 2,500,600 have less tendency to do this.

The phrase "alkali-containing residual material" is hereinafter intended to refer to residual matter (such as alkali metal salts, unreacted alkali, and neutralized caustic) which is present in the epoxide reaction product when the epoxide resin is produced by reacting a suitable polyfunctional phenol with either an epihalohydrin or dihalohydrin in the presence of alkali material.

The foregoing detailed description has been given for clearness of understanding only and no unnecessary limitations should be understood therefrom as modifications will be obvious to those skilled in the art.

We claim:

1. A method of removing water from an epoxide resin reaction product containing water, an epoxide resin which is produced by the condensation of a halohydrin and a polyfunctional phenol in the presence of caustic alkali, and remaining alkali-containing residual matter that is present after the epoxide is formed from said condensation reaction without necessitating further polymerization of the epoxide resin to a gel, which comprises distilling water from said reaction product, prior to the removal of residual matter from the epoxide resin, with the aid of a stripping liquid which boils from said reaction product at a temperature of about 71–99° C.

2. The method of claim 1 in which the distillation system is maintained at a temperature of about 71–99° C.

3. The method of claim 1 in which the stripping liquid is a solvent for said resin and the distillation system is maintained at a temperature of about 71–99° C.

4. The method of claim 3 in which the stripping liquid is a solvent for said resin and the distillation system is maintained at a substantially constant operating temperature within the range of about 71–99° C.

5. The method of claim 1 in which the reaction product is neutralized prior to distillation and the stripping liquid contains an ester.

6. The method of claim 1 in which a ketone is used as a stripping liquid.

7. The method of claim 1 in which methyl isobutyl ketone is used as a stripping liquid.

8. The method of claim 1 in which toluol is used as a stripping liquid.

9. A method of removing water from an epoxide resin reaction product containing water, an epoxide resin produced by the condensation of a halohydrin and a polyfunctional phenol in the presence of caustic alkali, and remaining alkali-containing residual matter that is present after the epoxide is formed from said condensation reaction without necessitating further polymerization of the epoxide resin to a gel, which comprises distilling water from said reaction product, prior to the removal of residual matter from the epoxide resin, with the aid of a stripping liquid which boils from said reaction product at a temperature of about 82–93.3° C.

10. The method of claim 9 in which the distillation system is maintained at a temperature of about 71–99° C.

11. The method of claim 9 in which the stripping liquid is a solvent for said resin and the distillation system is maintianed at a temperature of about 82–93.3° C.

12. The method of claim 9 in which the stripping liquid is a solvent for said resin and the distillation system is maintained at a substantially constant operating temperature within the range of about 82–93.3° C.

13. A method of removing water from an epoxide resin reaction product containing water, an epoxide resin which is produced by the condensation of a halohydrin and polyfunctional phenol in the presence of caustic alkali, and remaining alkali-containing residual matter that is present after the epoxide is formed from said condensation reaction without further polymerization of the epoxide resin to a gel, which comprises distilling water from said reaction product, prior to the removal of residual matter from the epoxide resin, with the aid of at least 20% stripping liquid, based on the weight of said reaction product, which boils from said reaction product at a temperature of about 71–99° C.

14. A method of removing water from an epoxide resin reaction product containing water, an epoxide resin which is produced by the condensation of a halohydrin and polyfunctional phenol in the presence of caustic alkali, and remaining alkali-containing residual matter that is present after the epoxide is formed from said condensation reaction without further polymerization of the epoxide resin to a gel, which comprises distilling water from said reaction product, prior to the removal of residual matter from the epoxide resin, with the aid of at least 35% stripping liquid, based on the weight of said reaction product, which boils from said reaction product at a temperature of about 71–99° C.

References Cited in the file of this patent

UNITED STATES PATENTS

| | | |
|---|---|---|
| 2,444,333 | Castan | Jan. 29, 1943 |
| 2,581,389 | De Groote | Jan. 8, 1952 |
| 2,637,119 | Germain | May 5, 1953 |
| 2,716,099 | Bradley | Aug. 23, 1955 |
| 2,767,157 | Masters | Oct. 16, 1956 |
| 2,774,748 | Howard et al. | Dec. 18, 1956 |

FOREIGN PATENTS

| | | |
|---|---|---|
| 484,200 | Great Britain | Apr. 28, 1938 |

OTHER REFERENCES

Webster's New International Dictionary, 2nd edition, page 862.